US007564023B2

(12) United States Patent
Blagden

(10) Patent No.: US 7,564,023 B2
(45) Date of Patent: Jul. 21, 2009

(54) SORTING APPARATUS AND METHODS

(75) Inventor: Troy Blagden, Queensland (AU)

(73) Assignee: Lighthouse One Pty. Ltd. as Trustee of the Lighthouse Unit Trust (AU)

( * ) Notice: Subject to any disclaimer, the term of this patent is extended or adjusted under 35 U.S.C. 154(b) by 0 days.

(21) Appl. No.: 10/595,120

(22) PCT Filed: Aug. 25, 2004

(86) PCT No.: PCT/AU2004/001135

§ 371 (c)(1),
(2), (4) Date: Feb. 24, 2006

(87) PCT Pub. No.: WO2005/018835

PCT Pub. Date: Mar. 3, 2005

(65) Prior Publication Data

US 2007/0056884 A1 Mar. 15, 2007

(30) Foreign Application Priority Data

Aug. 25, 2003 (AU) .............................. 2003904534

(51) Int. Cl.
*G01V 8/00* (2006.01)

(52) U.S. Cl. .................................................. 250/222.2

(58) Field of Classification Search .............. 250/222.2; 209/511, 576–581, 586–590

See application file for complete search history.

(56) References Cited

U.S. PATENT DOCUMENTS 3,009,571 A * 11/1961 Roberts, Jr. ................. 209/560
4,858,771 A 8/1989 Hawkins et al.
5,143,224 A 9/1992 Burchell
5,577,671 A 11/1996 Seppanen et al.
6,855,901 B1 * 2/2005 Guenard et al. ............. 209/577

FOREIGN PATENT DOCUMENTS

| | | | |
|---|---|---|---|
| NL | 1015994 | C2 | 10/2000 |
| RU | 1787589 | A | 1/1993 |
| WO | 0041143 | A | 7/2000 |

* cited by examiner

*Primary Examiner*—Seung C Sohn
(74) *Attorney, Agent, or Firm*—Brooks Kushman P.C.

(57) ABSTRACT

There is provided sorting apparatus wherein a particulate product stream (25) passes a concentrator (26) to feed product onto a conical dispersion plate (27) which delivers the product evenly in an annular mono-layer to a collimator comprising inner (30) and outer (31) product guides to produce, an annular, vertically directed product flow (32). Located within the annulus of the product flow (32) is a detector assembly comprising an upper detector and optics box (33) beneath which is mounted for rotation a beam splitting mirror (34) driven by a motor (35) and scanning product in the annular detection area (36). The product passing through the detection area (36) is bombarded with a source and the reflected or transmitted intensity signal (37) is then measured by a detector in the detector and optics box (33). The classified product is removed from the product stream via a rejector (40) operable in response to control means directed by the detector in the detector and optics box (33). The classified product (41) passes into a chute (42) to one side of a separation plate (43). The remaining product continues unhindered into the chute (44).

20 Claims, 5 Drawing Sheets

SORTING APPARATUS AND METHODS

This invention relates to sorting apparatus and methods.

This invention has particular but not exclusive application to sorting apparatus and methods for sorting bulk materials such as coal and produce, and for illustrative purposes reference will be made to such application. However, it is to be understood that this invention could be used in other applications, such as interdiction in particulate streams generally.

PRIOR ART

There is a well developed art of sorting materials in a flow by diverting the flow into a substantial monolayer, passing the monolayer past a sensor array to identify particles in the flow, and acting on that identification to process the flow. The processing may involve extracting or ejecting identified particles from the flow, or actively modifying the identified particles.

In general sorting apparatus in accordance with the prior art comprise a planar mono-layer product flow as illustrated in the comparative example of FIG. 1. This product flow 10 may be horizontal, vertical or any angle in between. As the product flow passes through the detection area 11 the product is bombarded by source beams 12. The reflected or transmitted intensity signal 13 is then measured by a detector 14.

There are advantages to be had by the use of a single point source or at least a single point source for each of several chromaticities. However, there is a fundamental law that provides a disadvantage, the ramifications of which have not been fully appreciated. There is an inherent limitation on the width of the flow across the direction of advance of the flow, the limit being determined for the flow adjacent the detector first by the distance of the source from the flow and secondly by the width of the flow.

The angle under which the light is projected onto the product and then reflected by the product is different for every point inspected over the full detection area. Due to the inverse square law $I=I^0/d^2$, where I is the final intensity, $I^0$ is the initial intensity, and d is the distance. If the reflected light, or any other reflected signal is measured at a distance from a point source (in this case the product) at an intensity of x. Then again measured at twice the distance, the signal would be ¼ x or a ¼ of the signal strength measured at x, ignoring the medium losses.

Thus as in FIG. 1 it can be seen that the distance reflected signals travel increases the further the product is away from the center of the detection area. Thus the measured signal intensity differs across the detection area. If two identical products were placed in the detection area, one centred and one on the edge of the detection area, and the returned intensity signals were compared, it would be seen that the intensity of the center would be greater than that of the identical product at the edge of the detection area. Thus the product reflected signal or signature would differ depending of its position in the detection area.

To be able to use this technology to inspect product and to make determinations on acceptable and non acceptable product, the product signature must be seen as the same to the decision making electronics of the equipment. To compensate for this, some systems employ complex pre-processing that massages the signal, so that a product appears to have the same signature regardless of position. Others use diaphragms (see patent specification WO98/443350) to try and compensate for the inverse square law effects, these reduce the overall amount signal returned to try and create a linear signal returned. This reduces the signal returned from any position to equate to that of the weakest signal at the extremities of the detection area.

The signal intensity decreases with a detection area width increase, thus there is an inherent limit to the possible width of the detection area. The limit is when the width is increased to such a point that the returned signal intensity of the product at the extremities of the detection area becomes unusable.

In addition, larger items may also create shadowing. This is not a significant issue in the centre of the flow, but further from the center the larger angle of incidence may result in individual particles partly shadowing other particles further from the center of the detection area. Thus not only do the outer portions of flow suffer from reduced signal intensity, but also suffers from an increased loss of signal through shadowing.

BROAD DESCRIPTION OF INVENTION

This invention in one aspect resides broadly in a sorting method including the steps of:

forming an at least part annular flow of particulate material by axially flowing said particulate material over a body member having a substantially conical flow surface past which said material may pass;

operating a detector substantially centred within said annular flow downstream of said body member and selected to apply a sorting criterion on the particles in said flow; and operating sorting means responsive to said detector to sort particles in said flow according to said criterion.

In a further aspect this invention resides broadly in sorting apparatus including:

a body member having a substantially conical surface bounded by an edge;

a supply of a particulate material to said flow surface, said supply being selected whereby said particulate material axially passes said edge forming an at least part annular flow;

a detector substantially centred within said annular flow downstream of said body member and selected to apply a sorting criterion on the particles in said flow; and sorting means responsive to said detector to sort particles in said flow according to said criterion In a further aspect this invention resides broadly in a sorting method including the steps of:

forming a flow of particulate material;

operating an optical detector assembly over said flow, said optical sensor assembly including a radiation source and a detector having at least one diffraction grating-based monochromator and being selected to apply a sorting criterion on the particles in said flow; and operating sorting means responsive to said optical detector means to sort particles in said flow according to said criterion.

In a further aspect this invention resides broadly in a sorting method including the steps of:

forming a flow of particulate material;

operating a detector assembly over said flow, said detector assembly being selected to apply a sorting criterion on the particles in said flow; and operating an array of a plurality of fluid-jet sorting means responsive to said detector assembly to sort particles in said flow according to said criterion by impingement, said array being operable in concert or sequentially to sort a said particle.

In a further aspect this invention resides broadly in sorting apparatus including:

a continuous supply forming a flow of a particulate material;

an optical detector assembly over said flow, said optical detector assembly including a radiation source and a detector having at least one diffraction grating-based monochromator and being selected to apply a sorting criterion on the particles in said flow; and sorting means responsive to said optical detector assembly to sort particles in said flow according to said criterion.

In a further aspect this invention resides broadly in sorting apparatus including:

means for forming a flow of particulate material;

a detector assembly over said flow, said detector assembly being selected to apply a sorting criterion on the particles in said flow; and an array of a plurality of fluid-jet sorting means responsive to said detector means to sort particles in said flow according to said criterion by impingement, said array being operable in concert or sequentially to sort a said particle.

DETAILED DESCRIPTION OF THE INVENTION

In the context of the present invention the "substantially conical flow surface" is to be taken to means a surface of a solid of the type that tapers from an upstream portion of the body to a peripheral edge, or a part of a solid of that type. An example of a particle flow over a body in the manner of the present invention is particles passing by gravity over the point of a cone to pass such as under gravity to fall off the body in an annular flow at the periphery of the base of the cone. As such it will be recognized by a person skilled in the art that the body member may be part or frusto-conical, and may have a base that is other than round, such as elliptical or polygonal. Similarly the term "annular flow" is to be taken to include all flows that are promoted by the forgoing and will be determined in substantial part by the shape of the periphery of the body portion.

The detector assembly may be selected to perform any suitable discrimination for sorting. For example, the detector may be selected to provide a method for detecting unwanted items among a flow of particles. Alternatively the sensor may be selected to tag or transform selected particles in the flow.

Particles may be formed into an annular, substantially mono-layer flow. Alternatively the particles may be disposed in a thicker flow, wherein more than one sensor assembly may be used and local turbulence presents the particles to one or the other of the sensor assemblies for detection. The flow may be in any selected orientation. For example the particulate material may be entrained or fluidized in a gas flow which may pass in any selected direction. However, it is envisaged that this invention will find most use in apparatus where the body has a substantially horizontal peripheral edge.

As the particulate flow passes the edge of the body it may enter a detection area downstream of the body member and containing the detector assembly. The detector assembly may include a source to actively scan the particulate flow in conjunction with a detector. Alternatively the detection may be a passive scan.

It is envisages that the detector assembly will in most cases comprise an active scanning means wherein the particulate flow is illuminated or bombarded by an actual or effectively rotating source, and that the reflected or transmitted intensity signal is then measured by a detector.

The advantage of a point source detector assembly where the source is centrally located in the flow path and the detector is likewise located as a point detector or internal (for reflectance or emission or scattering) or external (for transmission, emission or scattering) is that equal distances mean that the path length from the source to the particle to the detector is essentially the same for all particles. Of course all equivalent constructions are envisaged such as where the source comprises an annular array of a plurality of sources, to fulfil the same object as using a single point source located at the axis of the annular flow.

The annular flow concept may be embodied in an apparatus suitable for materials such as coal or the like that may be passed through the apparatus under gravity. There may be provided a substantially conical dispersion plate which may be supplied by any suitable means such as an in-feed chute. The dispersion plate may be used to deliver the product evenly in a mono-layer to the detection area. Product guide plates may be used to ensure correct product flow. The angle and surface of the conical dispersion plate is product dependant, designed to suit product characteristics. The in-feed chute may be adjustable to maximize an even distribution across the dispersion plate. The product passing through the detection area may be bombarded with a source. The reflected or transmitted intensity signal may then be measured by a detector. A decision may be made and the product, if deemed unacceptable, may be removed from the product stream via a rejector means.

The rejected product, whose trajectory or other characteristic has been changed by the rejecter, may pass to a reject chute or the like disposed in a separation side of a separation plate or the like for disposal. The remaining accepted product may continue unhindered into an accept-chute or the like for collection.

In operation, an identical product placed anywhere in the detection area results in the same returned signal or signature from the product. In preferred embodiments of the present invention there are no effects from the inverse square law as the distance from source and/or detector to the product is always the same. In a circular or annular product flow the radius or the distance from product to detector remains constant. Shadowing is also minimized as there is no angular reflection from the product.

The sensor apparatus may be light-based and may take the form of a conventional monochromatic point-source beam which scans the particulate flow in a direction normal to the particulate flow direction. As in conventional optical sorting systems that use a point source of light targeted onto the product, this point source may be laser light or any other point source. The resulting reflected light may be filtered to remove all other wavelengths than the required wavelength to render the signal monochromatic. This may be done conventionally with a band pass optical filter that transmits only the required wavelength and measured for intensity; the rest of the reflected intensity is reflected and wasted. Depending on optical setup the opposite can be achieved, with a band reject filter where the required wavelength is reflected and measured and the transmitted intensity is essentially wasted.

In some cases the reflected signal from the particulate flow needs to be split into different wavelength bands (polychromatic) and then measured by a detector, where the criterion for selection may use this approach. The combination of these different wavelength intensities builds a typical pattern or signature of the product on which the sorting means may act.

The use of band pass or band reject filters has a few limitations. Firstly these can only separate the wavelength the optical filter is designed to separate. Secondly optical band pass and band reject filters have transmission and rejection losses. If a number of filters are placed in series and the first band reject filter removes a desired wavelength. The remaining wavelengths pass or are transmitted through the optical filter, with a loss of intensity. This is then repeated at each optical filter. Each time the light is transmitted or reflected, loss of intensity occurs. Filters can only be added until the combined transmitted losses sustained to the remaining wavelengths becomes unusable Thus there is a physical limit to the number of filters and the number of discrete wavelengths measurable.

The use of a diffraction grating in sorting machine optics can reduce the limiting effects of optical band pass and band reject filters, and are particularly suited to the circular scanning configuration of the present invention with its inherent avoidance of disadvantages the inverse square law imposes on prior art systems.

In apparatus where a diffraction grating based system is used as the core of the sensor means, the resulting reflected light (polychromatic) from the particulate flow when scanned by the point source and which passes through the detection area may be projected onto the surface of a diffraction grating. The diffraction grating by design diffracts the light into a spectrum. This spectrum may be measured in discrete places by the use of any number of photo multipliers, CCD arrays or other photoelectric sensitive measuring devices. This allows for the measurement of the intensity at any desired wavelength or wavelengths with only a single loss of intensity at the diffraction grating. The physical size, grooves per millimetre and the blaze angle of diffraction grating may change to suit the application requirement.

The sorting means may take any suitable form. Existing sorting devices may be used such as devices which reject the unwanted items from a monolayer flow by the use of air blasts generated from a manifold containing a single row of air valves. Each valve faces approximately 90° to the particulate flow. The row of valves is usually parallel to the product flow and offset with a clearance gap. Unwanted items are detected among a flow of good product when there is substantial difference between their respective light reflections or signature.

When an unwanted product is detected, the sensor input may be used to generate a signal used to cause the corresponding ejector to fire. This signal may be timed so that the unwanted product is in front of the ejector when fired. The concentrated jet of air from the ejector or ejectors (larger products) applies force to the product surface and deflects the product. To deflect the trajectory of heavier product more force or a longer time to apply force is required. Since the ejector is stationary and the product is moving, there is only a limited time the ejector can fire on and apply force to the unwanted product. If insufficient force is applied to the product in the time that it is in front of the ejector then the only other way is to use higher air pressures and/or larger ejectors. This additional pressure can create a lot of dust, water drops, or the like which might enter the inspection area and reduce the reflected or transmitted signal. The additional air pressure may also damage the product.

Accordingly, in the case of larger and/or heavier product there could be incorporated extra rows of ejectors disposed in a line substantially along the direction of flow, each configured to impact a selected particle sequentially. Thus each piece of product may have not only one ejector but many ejectors firing a jet of air consecutively as the product passes each ejector. There is less force required to be delivered by each ejector, but the additive affect gives the same deflecting force as a single more powerful blast. This allows for less air pressure and thus less dust, water, and product degradation. The number of additional rows of valves is product and application dependant.

BRIEF DESCRIPTION OF THE DRAWINGS

In order that this invention may be more readily understood and put into practical effect, reference will now be made to the accompanying drawings which illustrate a preferred embodiment of the invention and wherein:

FIG. 1, representing the prior art, is discussed earlier in this specification.

FIG. 2 illustrates the theoretical basis for the present invention, and wherein a product flow, indicated as to direction by the solid arrow 20, is directed in an annulus 21 past a substantially axially located detector 22. Individual particles 23 reflect incident radiation to the detector 22, the reflected beams 24 having a character or quality (such as intensity or the like) that is characteristic of the particle 23.

Optical Sorting Apparatus and Methods

Figure 1:
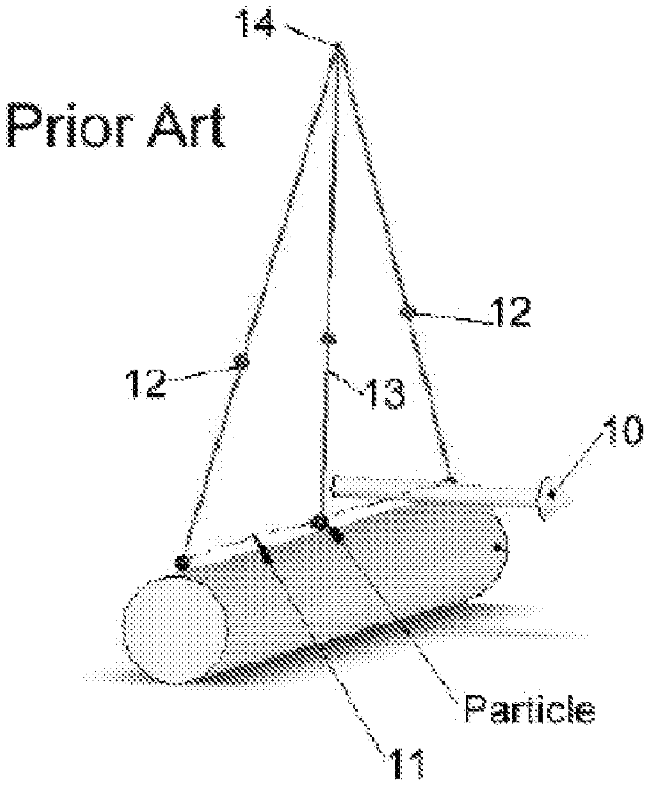
FIG. 1 is a view of scanning apparatus in accordance with the prior art.
Figure 2:
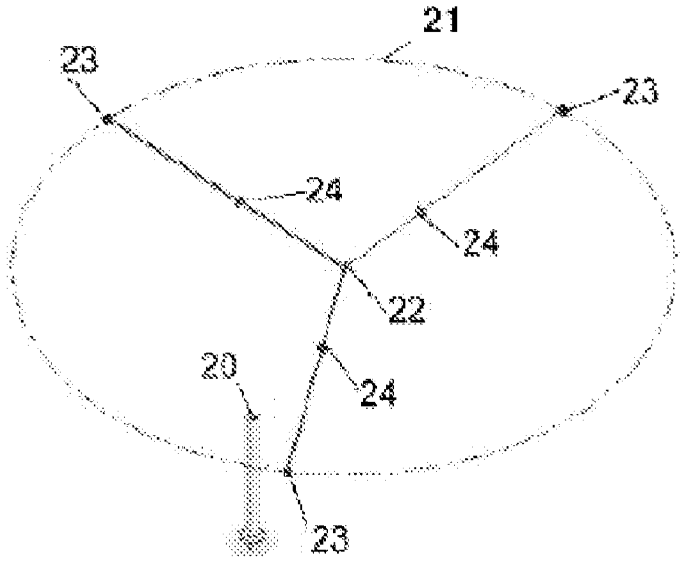
FIG. 2 is a concept diagram of scanning used in methods in accordance with the present invention.
Figure 3:
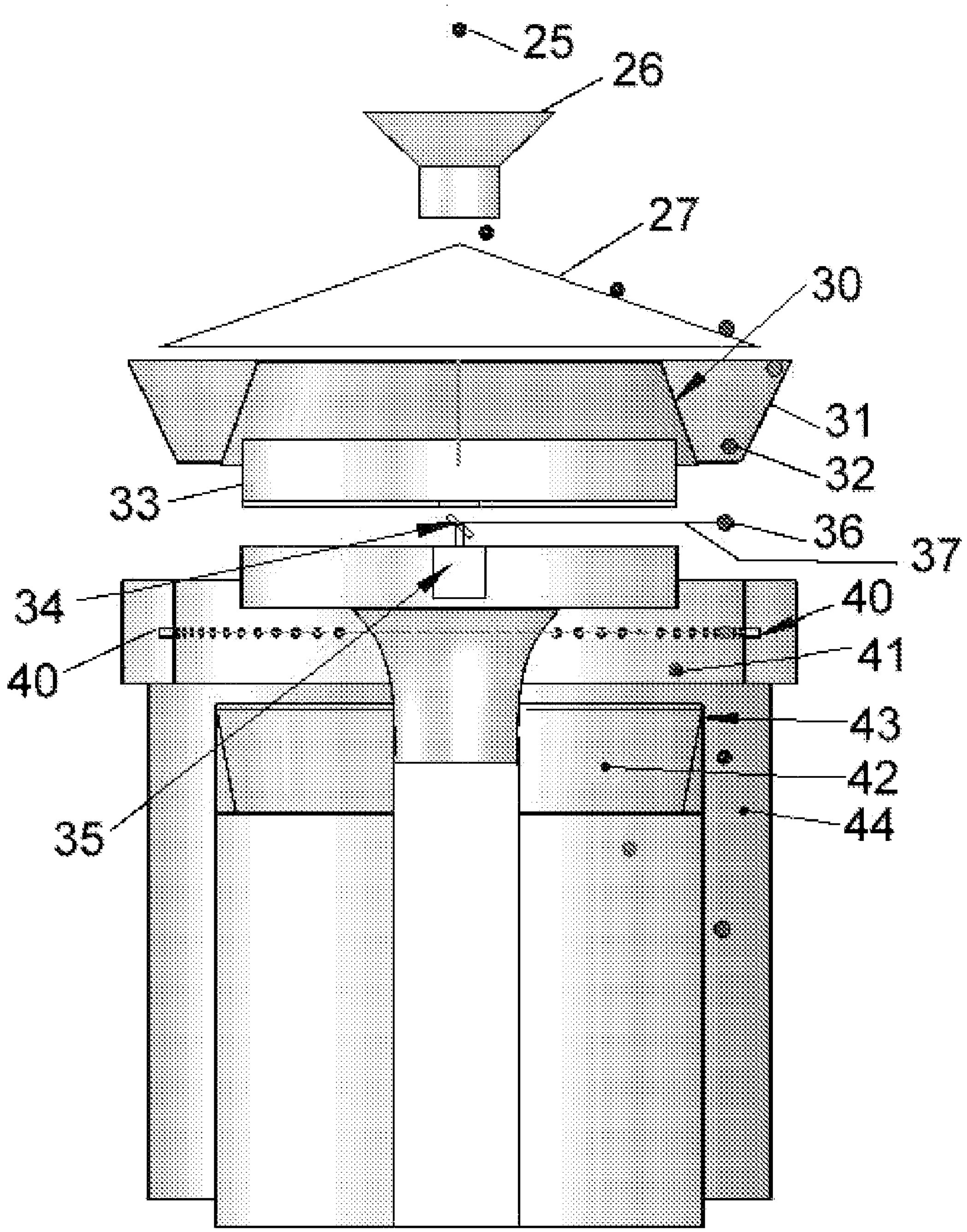
FIG. 3 is a side view of the apparatus in accordance with the present invention.

In FIG. 3 there is illustrated an embodiment of the annular flow concept and wherein a particulate product stream 25 is concentrated by a concentrator 26 to feed product onto the apex of a conical dispersion plate 27. The dispersion plate 27 delivers the product evenly in an annular mono-layer to a collimator 64 comprising inner 30 and outer 31 product guides which are nested, coaxial, opposed and frustoconical, to produce, an annular, vertically directed product flow 32.

Located within the annular product flow 32 is a detector assembly comprising an upper detector and optics box 33 beneath which is mounted for rotation a beam splitting mirror 34 driven by a motor 35 and scanning product in the annular detection area 36. The product passing through the detection area 36 is bombarded with a source S and the reflected or transmitted intensity signal 37 is then measured by a detector in the detector and optics box 33.

A decision is made and the product, if deemed unacceptable, is removed from the product stream via a relevant one of a plurality of rejectors 40 operable in response to control means directed by the detector in the detector and optics box 33.

The rejected product 41, whose trajectory has been changed by the rejector 40, passes into a reject chute 42 to one side of a separation plate 43. The remaining accepted product continues unhindered into the accept chute 44 for collection.

Those optical sorting systems that use a point source of light targeted onto the product, this point source may be laser light or any other point source. The resulting reflected light may be filtered to remove all other wavelengths than the required wavelength (monochromatic). This is usually done with a band pass optical filter that transmits only the required wavelength and measured for intensity; the rest is reflected and wasted. Depending on optical setup the opposite can be achieved, with a band reject filter where the required wavelength is reflected and measured and the transmitted is wasted.

Figure 4:
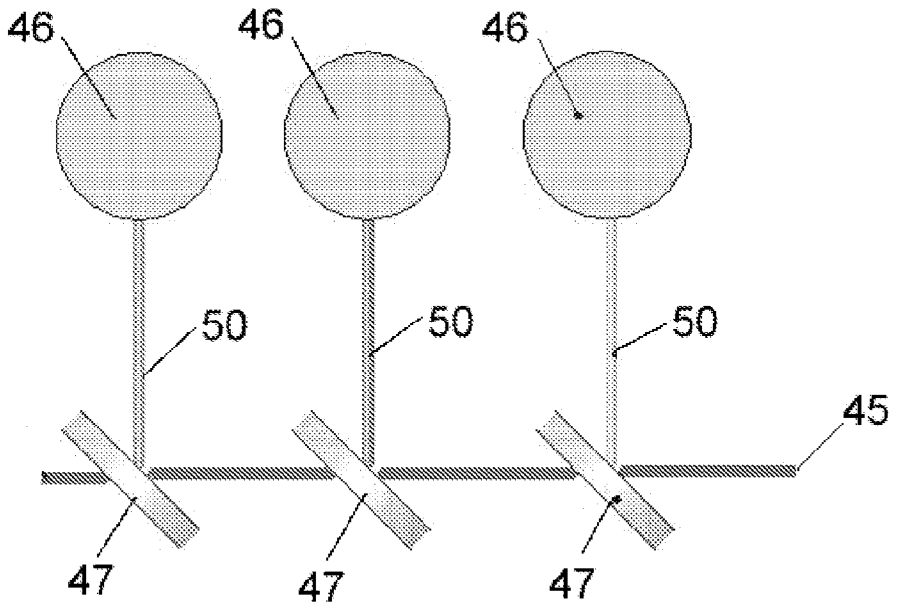
FIG. 4 is a concept diagram of multiple band pass detection used in methods in accordance with the present invention.

In FIG. 4 the resultant reflected signal 45 from the product is split into different wavelength bands (polychromatic) by sequential capture filters 47 and then the monochromated beams 50 are measured by detectors 46. This is to determine the intensity of light at different wavelengths. The combination of these different wavelength intensities builds a typical pattern or signature of the product on which the sorting electronics makes decisions.

The use of band pass or band reject filters such as described with reference to FIG. 4 has a few limitations. Firstly you can only separate the wavelength the optical filter is designed to separate. Secondly optical band pass and band reject filters have transmission and rejection losses. The transmitted or reflected loss is determined by the optical characteristics and obtainable from any manufacturer. If a number of filters are placed in series and the first band reject filter removes a desired wavelength. The remaining wavelengths pass or transmitted through the optical filter, a loss of intensity occurs. This is then repeated at each optical filter. Each time the light is transmitted or reflected, loss of intensity occurs. Filters can only be added until the combined transmitted losses sustained to the remaining wavelengths become unusable. Thus there is a physical limit to the number of filters and the number of discrete wavelengths measurable.

Figure 5A:
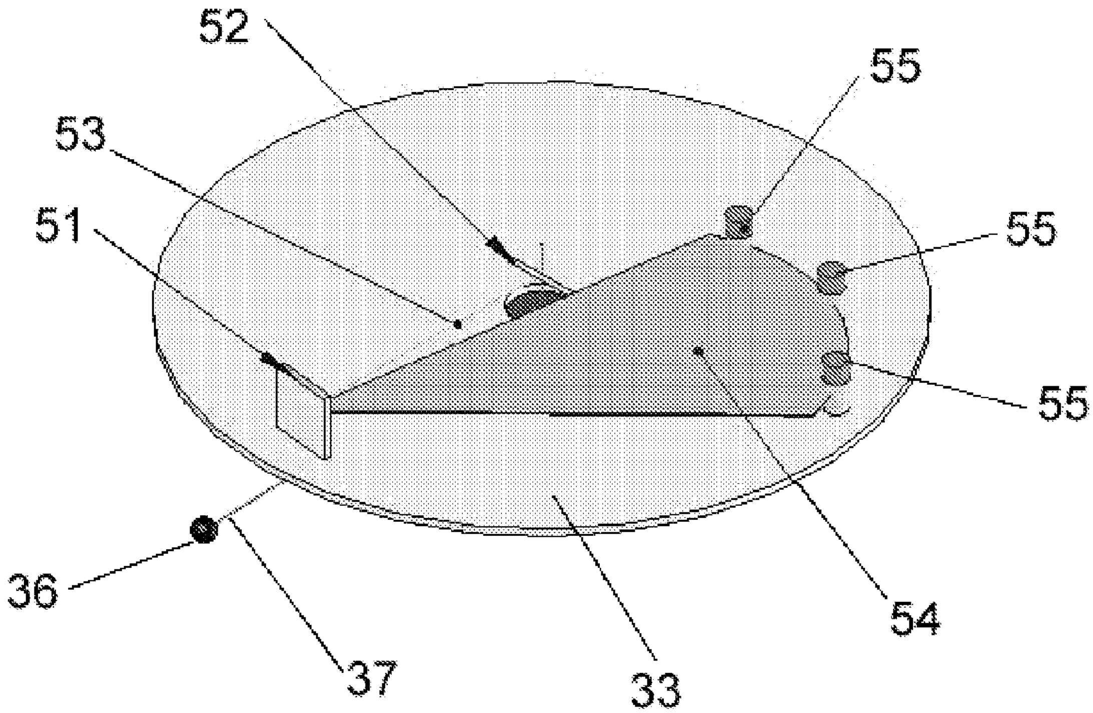
FIG. 5A is a concept perspective view of diffraction grating-based detection used in methods in accordance with the present invention.
Figure 5B:
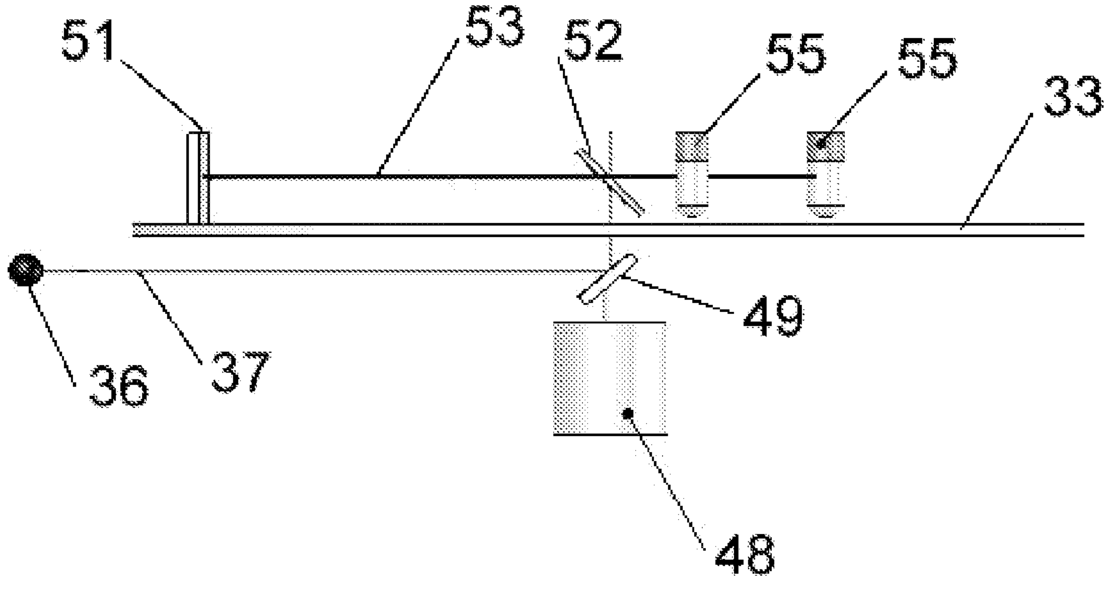
FIG. 5B is the concept of diffraction grating based detection of FIG. 5A, viewed from the side.

The use of a diffraction grating in sorting machine optics such as illustrated in FIGS. 5A and 5B can reduce the limiting effects of optical band pass and band reject filters. The resulting reflected light (polychromatic) 37 from the product in the detection area 36 is reflected by a rotating scanning mirror 49 driven by a motor 48 into the detector and optics box 33. The beam then passes onto a fixed mirror 52 to produce a reflected beam 53 projected onto the surface of a diffraction grating 51. The diffraction grating by design diffracts the light into a spectrum 54. This spectrum is measured in discrete places by the use of any number of photo multipliers, CCD arrays or other photoelectric sensitive measuring device/s 55. This allows for the measurement of the intensity at any desired wavelength or wavelengths with only a single loss of intensity at the diffraction grating. This loss is determined by the optical characteristics and obtainable from any manufacturer. The physical size, grooves per millimeter and the blaze angle of diffraction grating may change to suit the application requirement.

Figure 6:
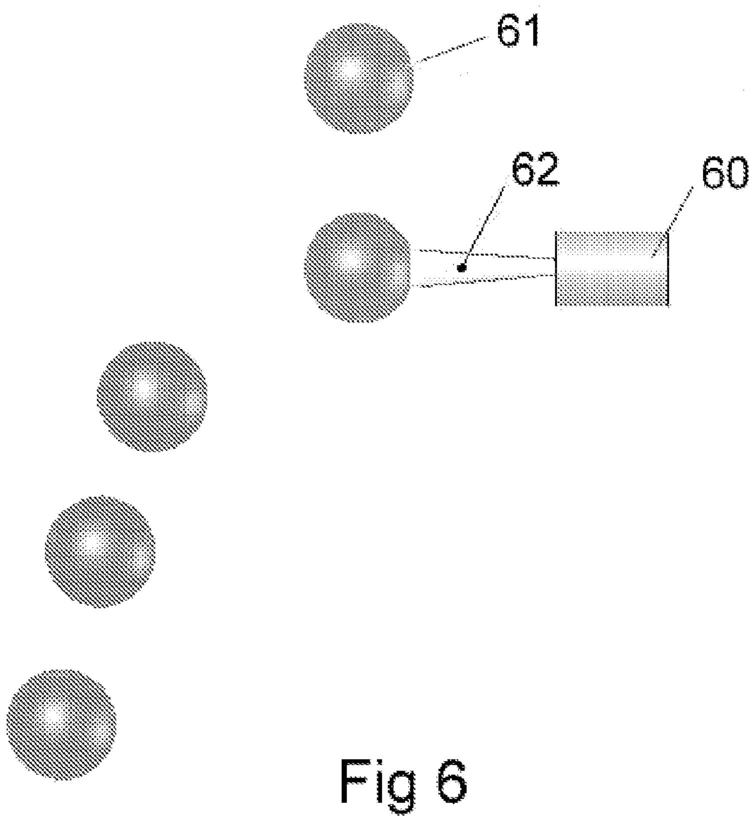
FIG. 6 is a sequence diagram of operation of an ejector of the prior art which may be used in apparatus in accordance with the present invention.

Existing sorting devices reject the unwanted items by the use of air blasts generated from a manifold containing a single row of air valves 60 as illustrated in comparative FIG. 6. Each valve 60 faces approximately 90° to the product 61. The row of valves is usually parallel to the product flow (angle of product flow is irrelevant) and offset with a clearance gap. Unwanted items are detected among a flow of good product when there is substantial difference between their respective light reflections or signature.

When an unwanted product is detected, the electronics send a signal to the corresponding ejector to fire. This signal is timed so that the unwanted product is in front of the ejector when fired. The concentrated jet of air 62 from the ejector or ejectors (larger products) applies force to the product surface and deflects the product. To deflect the trajectory of heavier product more force or a longer time to apply force is required. Since the ejector is stationary and the product is moving, there is only a limited time the ejector can fire on and apply force to the unwanted product. If insufficient force is applied to the product in the time that it is in front of the ejector then the only other way is to use higher air pressures and/or larger ejectors. This additional pressure can create a lot of dust, water drops, which might enter the inspection area and reduce the reflected light from the product. The additional air pressure may also damage the product.

Figure 7:
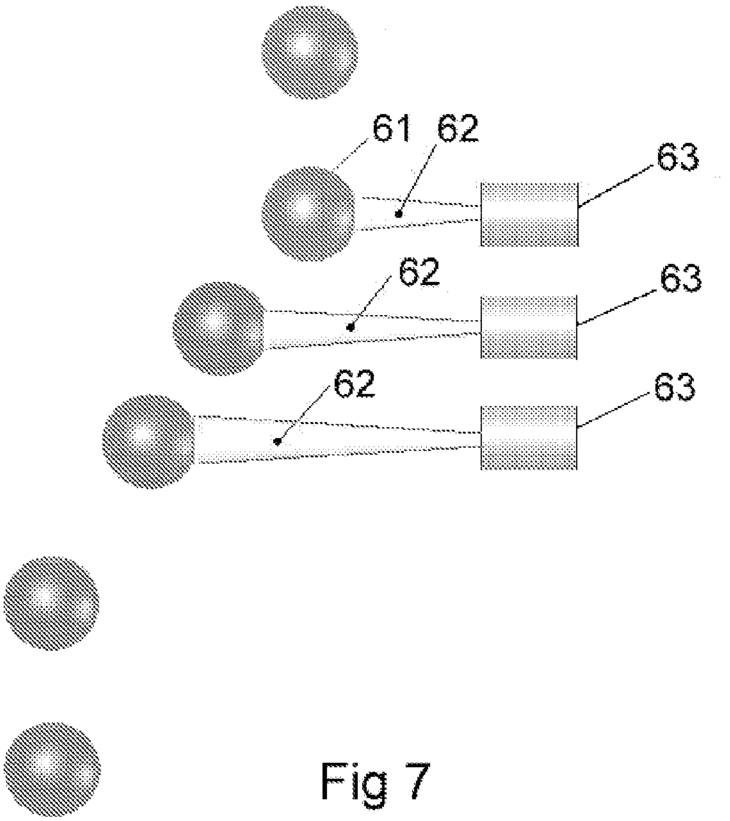
FIG. 7 is a sequence diagram of operation of a new ejector array which may be used in apparatus in accordance with the present invention.

For larger and/or heavier product there is illustrated in FIG. 7 an ejector arrangement incorporating extra vertically spaced rows of ejectors 63. Thus each piece of product 61 has many a jets of air 62 firing consecutively as the product passes each ejector. There is less force required to be delivered by each ejector, but the additive affect gives the same deflecting force as a single more powerful blast. This allows for less air pressure and thus less dust, water, and product degradation. The number of additional rows of valves is product and application dependant.

Apparatus and methods in accordance with the foregoing embodiments (excluding the comparative examples) provide a technology which can inspect large volumes of any kind of free flowing bulk material and which ensures optimum and uniform sensitivity over the full inspection area allowing for ideal detection and classification of unwanted or wanted items in a very economical manner.

In addition process conditions that affect transmissibility of the medium through which the source illuminates and the signal passes, often reduces the signal linearly with distance. In the present embodiments these are cancellable due to the equal distance that the signal travels for all points of scanning the flow.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

The invention claimed is:

1. A sorting method including the steps of:

forming an at least part annular, substantially monolayer flow of particulate material by axially flowing said particulate material over a dispersion member having a substantially conical flow surface bounded by an axially perpendicular peripheral edge whereby product flow is directed onto substantially the whole conical flow surface in a monolayer and over said edge to pass through a collimator comprising opposed inner and outer guides in a nested, coaxial, opposed and frusto conical, arrangement to form an annular, vertical, concentric monolayer product flow;

operating a detector having an optical element located substantially centered within said annular flow downstream of said collimator whereby the path length from all parts of the flow passing between the collimator and the optical element is substantially constant, as a consequence of the collimated and monolayered flow, said detector being selected to apply a sorting criterion on the particles in said flow; and operating a sorting means responsive to said detector to sort particles in said flow according to said criterion.

2. A sorting means apparatus comprising:

a dispersion member having a substantially conical surface bounded by an axially perpendicular peripheral edge;

an inlet supplying a particulate bulk material to said dispersion member conical surface, so that said particulate bulk material is radially disbursed to substantially all of the dispersion member conical surface and axially passes from said peripheral edge;

a collimator for receiving the material passing downstream from the peripheral edge comprising of opposed inner and outer guides in a nested, coaxial, and frustoconical arrangement, forming an annular, vertical, substantially monolayer concentric particulate flow;

a detector having an optical element located substantially centered within said annular flow downstream of the collimator whereby the path length from all parts of the flow to said optical element is substantially constant as a consequence of the collimated monolayer flow, said detector being selected to apply a sorting criterion on the particles in said bulk flow; and sorting means responsive to said detector to sort particles in said flow according to said sorting criterion.

3. Sorting apparatus according to claim 2, wherein said particulate flow is irradiated by an actual or effectively rotating a source, and that the detector detects the intensity of the reflected or transmitted component of said radiation.

4. Sorting apparatus according to claim 3, wherein said source is a monochromatic point-source beam which scans the particulate flow in a direction substantially normal to the particulate flow direction.

5. Sorting apparatus according to claim 4, wherein said reflected light is filtered to remove all other wavelengths than the required wavelength to render the detected signal monochromatic.

6. Sorting apparatus according to claim 5, wherein said filtering is performed using one or more band pass optical filters that transmit only the required wavelength bands.

7. Sorting apparatus according to claim 5, wherein said filtering is performed using one or more band reject optical filters that reflect only the required wavelength bands.

8. Sorting apparatus according to claim 3, wherein said detected light is polychromatic.

9. Sorting apparatus according to claim 8, wherein said polychromatic light is resolved into a spectrum by a diffraction grating, and wherein said detector comprises a plurality of detection elements disposed to interpret said spectrum.

10. Sorting apparatus according to claim 9, wherein said detection elements are selected from photo multipliers, CCD arrays or like photoelectric sensitive measuring devices.

11. Sorting apparatus according to claim 2, wherein said sorting means comprises one or more rejectors responsive to said detector and adapted to impinge upon a selected particle to displace said particle from said flow.

12. Sorting apparatus according to claim 11, wherein said one or more rejectors each comprise means to generate an air blast which rejects a detected particle from the particulate flow in response to a signal generated in response to detection by said detector.

13. Sorting apparatus according to claim 12, wherein said rejectors comprise an annular manifold containing a single row of air valves, each valve facing approximately 90° to the particulate flow, substantially parallel to the product flow and offset with a clearance gap therefrom.

14. Sorting apparatus according to claim 12, wherein said rejectors comprise a plurality of annular manifolds each containing a single row of air valves, each valve facing approximately 90° to the particulate flow, substantially parallel to the product flow and offset with a clearance gap therefrom, and wherein said air valves are aligned between the rows in the direction of said flow, whereby aligned air valves are operated sequentially to impact a selected particle sequentially.

15. The sorting method of claim 1 further comprising:

forming an at least part annular flow of material;

detecting by a detector radiation from the material in the at least part annular flow, the radiation from substantially all parts of the flow having traveled substantially the same distance from the annular flow to the detector; and operating a sorting mechanism in response to the detected radiation to sort the material in the flow.

16. The method of claim 1, wherein the radiation is received by an optical element locked substantially centrally with respect to the at least part annular flow, and wherein the optical element directs the radiation to the detector.

17. The sorting method according to claim 16 wherein the optical element comprises a rotatable mirror.

18. The sorting apparatus according to claim 1 further comprising:

means for forming an at least part annular flow of material;

a detector for detecting radiation from the material in the at least part annular flow after the radiation from substantially all parts of the flow has traveled substantially the same distance from the flow to the detector; and a sorting mechanism for sorting material in the flow in response to the radiation detected by the detector.

19. The sorting apparatus according to claim 2, wherein an optical element is arranged substantially centrally with respect to the annular flow when the annular flow is created for directing radiation from the material in the annular flow to the detector.

20. The sorting apparatus according to claim 2 wherein the optical element comprises a rotating mirror.

* * * * *